United States Patent
Bacchus et al.

(10) Patent No.: US 7,594,128 B2
(45) Date of Patent: Sep. 22, 2009

(54) SYSTEMS AND METHODS TO DETERMINE PROCESSOR UTILIZATION

(75) Inventors: Reza M. Bacchus, Spring, TX (US); Timothy W. Majni, The Woodlands, TX (US); Thomas D. Rhodes, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 11/193,834

(22) Filed: Jul. 29, 2005

(65) Prior Publication Data

US 2006/0031691 A1 Feb. 9, 2006

Related U.S. Application Data

(60) Provisional application No. 60/598,732, filed on Aug. 4, 2004.

(51) Int. Cl.
*G06F 1/26* (2006.01)
*G06F 1/32* (2006.01)

(52) U.S. Cl. ............... 713/300; 713/320; 713/322; 713/323; 714/22; 714/47

(58) Field of Classification Search ......... 713/300, 713/320, 322, 323; 714/22, 47
See application file for complete search history.

(56) References Cited

U.S. PATENT DOCUMENTS

| 5,630,110 | A  | * | 5/1997  | Mote, Jr. ............... 713/501 |
| 6,438,697 | B2 |   | 8/2002  | Atkinson |
| 6,636,976 | B1 | * | 10/2003 | Grochowski et al. ........ 713/320 |
| 2003/0204789 | A1 | | 10/2003 | Peebles et al. |
| 2004/0203449 | A1 | * | 10/2004 | Choi ..................... 455/67.11 |
| 2004/0267548 | A1 | * | 12/2004 | Jones ..................... 705/1 |
| 2005/0005012 | A1 | | 1/2005  | Odhner et al. |
| 2005/0018611 | A1 | | 1/2005  | Chan et al. |

* cited by examiner

*Primary Examiner*—Thomas Lee
*Assistant Examiner*—Michael J Brown

(57) ABSTRACT

In at least some embodiments, a system comprises a processor and a memory coupled to the processor. The memory stores processor performance utility instructions and performance adjustment instructions. When executed, the processor performance utility instructions are configured to cause activities of the processor to be counted and to cause a processor utilization value to be determined based on the counts. When executed, the performance adjustment instructions are configured to adjust the processor utilization value based on a comparison of the processor's current operating frequency and maximum operating frequency.

19 Claims, 6 Drawing Sheets

SYSTEMS AND METHODS TO DETERMINE PROCESSOR UTILIZATION

CROSS-REFERENCE TO A RELATED APPLICATION

The present application claims the benefit of, and incorporates by reference, provisional application Ser. No. 60/598,732, filed Aug. 4, 2004, and entitled "Method To Determine True Processor Utilization."

BACKGROUND

To conserve power during periods of light workload, a processor may be dynamically set to run at a lower frequency. For example, if a processor having a maximum frequency of 100 MHz encounters a light workload, the processor may be set to run at 80 MHz. If the workload increases, the processor's speed may be increased to accommodate the workload.

A performance utility that monitors a processor's utilization relative to the processor's current frequency may provide an inaccurate utilization measurement. For example, if the processor mentioned above is set to run at its maximum frequency of 100 MHz, a utilization measurement based on the current frequency is accurate. However, if the processor is set to run at the reduced rate of 80 MHz, a utilization measurement based on the current frequency is inaccurate by the ratio of the reduced frequency of the processor compared to the maximum frequency of the processor (e.g., 80/100).

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to methods and systems that enable an accurate measurement of processor utilization, even if a processor's operating frequency is dynamic. In at least some embodiments, a processor utilization during a period of time is estimated by quantifying a processor's activity level during the period of time and, if necessary, adjusting the processor utilization based on a comparison of the processor's operating frequency during the period of time versus the processor's maximum operating frequency.

Figure 1:
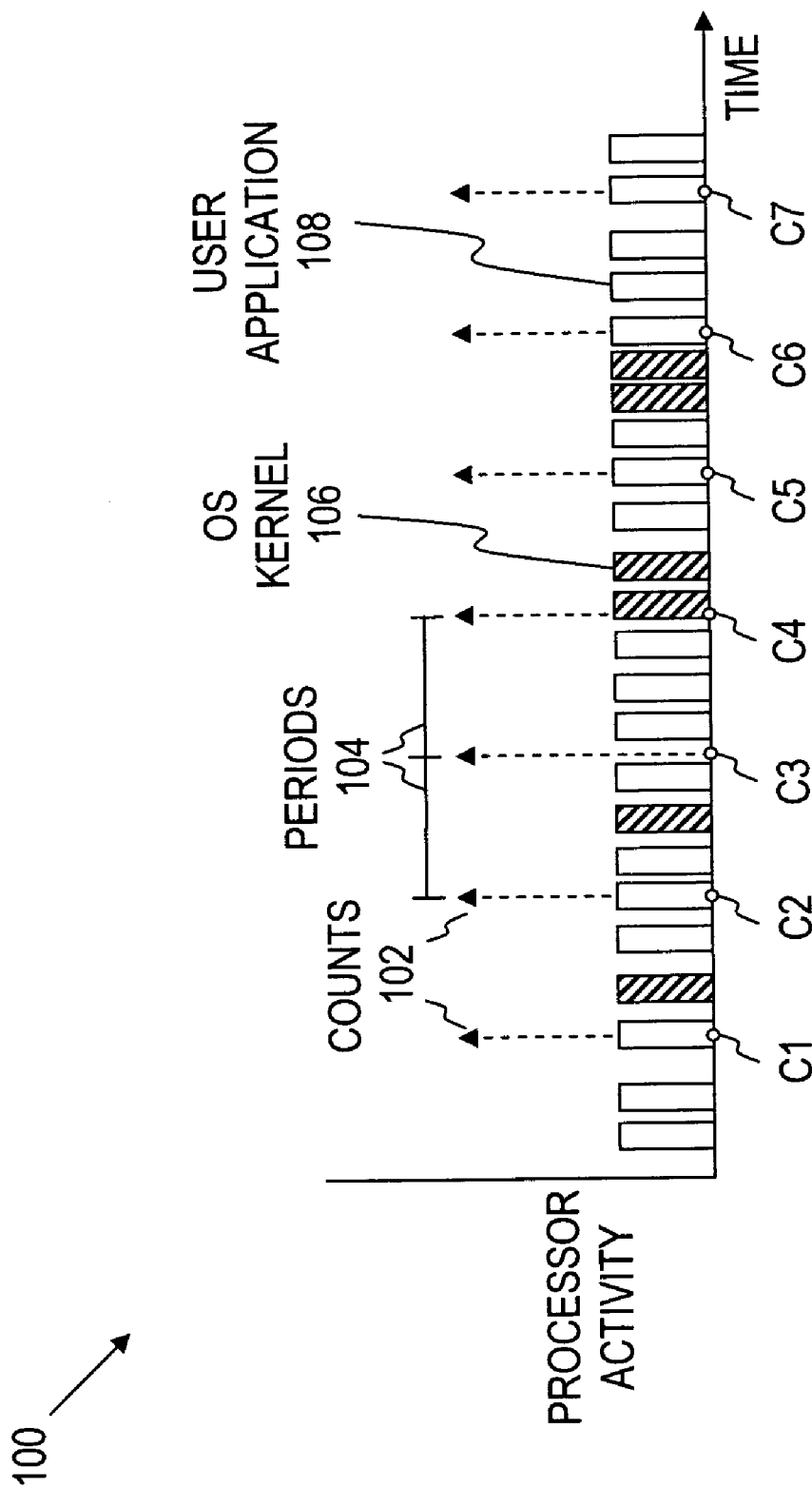
FIG. 1 shows a diagram of counting processor activities in accordance with embodiments of the invention.

FIG. 1 shows a diagram 100 of counting processor activities in accordance with embodiments of the invention. As shown in FIG. 1, processor activities such as operating system (OS) kernel activities 106 and user application activities 108 are represented with respect to time. At regular time periods 104, the activity being performed by the processor is ascertained and counted (referred to herein as a "count" 102). In FIG. 1, seven counts (C1-C7) 102 are shown. C1, C2, C5, C6 and C7 are user application counts. C4 is an OS kernel application count and C3 is an "idle" count (i.e., the processor is not performing any activities or any recognized activities).

In at least some embodiments, an OS helps determine the activity being performed by the processor during the counting process shown in FIG. 1. For example, an OS may manage counting processes and threads at a regular interval such as every 10 milliseconds (ms). In such case, the OS programs hardware to interrupt the processor every 10 ms. At every interrupt (in addition to managing counting processes and threads), the OS determines if the processor is executing OS kernel code, user application code or idle code. The OS then updates one of an OS kernel counter, a user application counter and an idle counter accordingly. A processor performance monitoring utility is configured to extract the counter data from the OS at predetermined intervals. For example, if at the end of 1 second (e.g., 100 interrupts), the OS determines that the processor executed the OS kernel code 20 times, the user application code 70 times and the idle code 10 times, the processor performance utility reports that the processor was 90% utilized based on Equation (1) shown below.

$$U_{CPU} = [(C_{kernel} + C_{app})/(C_{kernel} + C_{app} + C_{idle})] \times 100\% \qquad \text{Equation (1)}$$

In Equation (1), $U_{CPU}$ is the observed processor utilization, $C_{kernel}$ is the number of OS kernel counts, $C_{app}$ is the number of user application counts and $C_{idle}$ is the number of idle counts. As previously described, the counts ($C_{kernel}$, $C_{app}$, $C_{idle}$) are extracted and the observed processor utilization ($U_{CPU}$) is determined at periodic intervals (e.g., once per second). Thus, if the counts during an interval are $C_{kernel}=20$, $C_{app}=70$ and $C_{idle}=10$ as described above, $U_{CPU}=[(20+70)/(20+70+10)] \times 100\% = 90\%$. The value of $U_{CPU}$ may change every interval based on new counter data. A processor performance utility may be configured to report the value of $U_{CPU}$ as a numeric value or as part of a graph.

For systems with multiple processors, the OS uses an OS kernel counter, a user application counter and an idle counter for each processor. At periodic intervals, the processor performance monitoring utility is able to extract all the counter data from the OS and report the processor utilization of each processor and/or the total system utilization (e.g., the total system utilization may be determined by averaging all the processor utilizations).

Embodiments of the invention implement processors having dynamic operating frequencies. For example, an operating frequency may be adjusted between a maximum operating frequency and a minimum operating frequency based on workload. U.S. Pat. No. 6,438,697 entitled "Demand-Based Processor Clock Frequency Switching" describes a method and system for dynamically changing a processor's operating frequency and is herein incorporated by reference as if reproduced in its entirety. To account for dynamic operating frequencies, a software utility (e.g., the processor performance utility or another utility) adjusts the observed processor utilization ($U_{CPU}$) value of equation (1) by comparing the processor's current operating frequency with the processor's maximum operating frequency as shown in Equation (2) shown below.

$$U_{CPU\_DYNAMIC} = U_{CPU} \times (F_{current}/F_{max}) \quad \text{Equation (2)}$$

In Equation (2), $U_{CPU\_DYNAMIC}$ is the "true" processor utilization of a processor having a dynamic operating frequency. In at least some embodiments, the true processor utilization is relative to the CPU's maximum operating frequency. Also shown in Equation (2), $U_{CPU}$ is the observed processor utilization as described above for Equation (1). $F_{current}$ is the current operating frequency of the processor being monitored and $F_{max}$ is the maximum operating frequency of the processor being monitored. The values of $U_{CPU\_DYNAMIC}$, $U_{CPU}$, $F_{current}$ and $F_{max}$ are determined at periodic intervals and are reported by a software utility such as a processor performance utility. For example, if $U_{CPU}$=90%, $F_{current}$=80 Mhz and $F_{max}$=100 Mhz during a given interval, then the value of $U_{CPU\_DYNAMIC}$ during the given interval is 90%×(80/100)=72%. Thus, Equation (2) provides a "true" processor utilization value that accounts for a processor's operating at less than a maximum frequency (i.e., the observed processor utilization ($U_{CPU}$) value provided by Equation (1) is not accurate if a processor operates at less than a maximum frequency).

Calculating and reporting the $U_{CPU\_DYNAMIC}$ value instead of the observed $U_{CPU}$ value is useful in several ways. In at least some embodiments, the $U_{CPU\_DYNAMIC}$ value is used to determine business-related details (e.g., details of a server-based business). For example, an Information Technology (IT) department may monitor the observed processor utilization over a period of time (e.g., weeks or months) to determine the efficiency of a server-based application (e.g., a database, a mail server or a web-based application). If the processor performance monitor reports an inflated observed utilization (e.g., in the example above, an observed utilization of 90% based on Equation (1) is inflated if the monitored processor's operating frequency is less than the processor's maximum operating frequency), an operator may feel obligated to initiate an unnecessary effort to streamline the server-based application. Also, an IT department may monitor the observed processor utilization over a period of time to determine whether to deploy more servers or fewer servers. If the processor performance monitor reports an inflated observed utilization of a server's processors, an operator may feel obligated to deploy more servers than necessary. Also, an IT department that charges customers based on their processor utilization may monitor the observed processor utilization over a period of time to determine how much to charge customers. Therefore, inflated observed processor utilization values may result in inflated charges. For at least these reasons, calculating and reporting $U_{CPU\_DYNAMIC}$ using Equation (2) instead of the observed $U_{CPU}$ using Equation (1) is useful.

Figure 2:
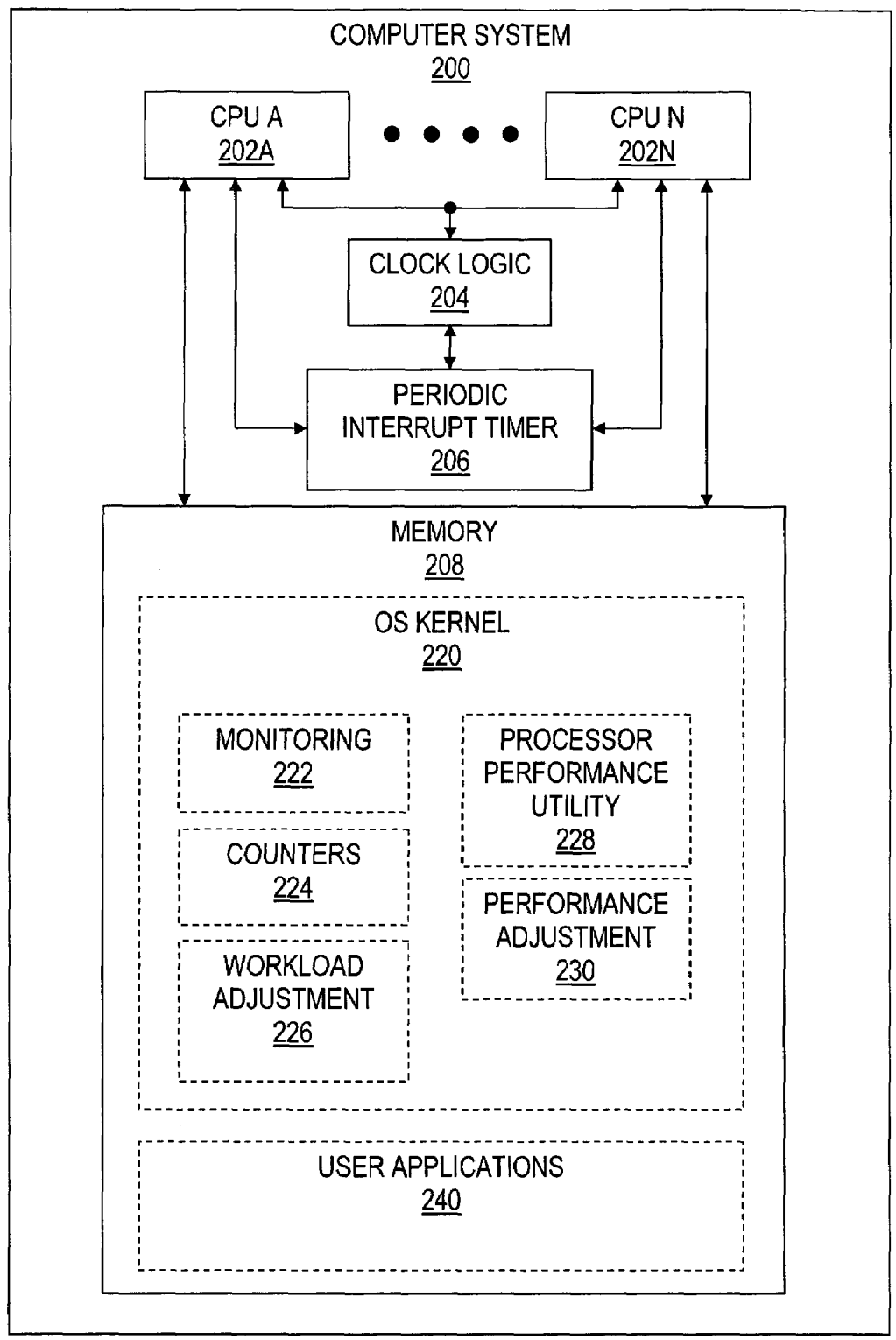
FIG. 2 shows a computer system in accordance with embodiments of the invention.

FIG. 2 illustrates a computer system 200 in accordance with embodiments of the invention. In at least some embodiments, the computer system 200 is a server. The computer system 200 is configurable to report a true processor utilization value (e.g., $U_{CPU\_DYNAMIC}$) in at least two ways. In a first way, counter data (e.g., OS kernel counts, user application counts, and idle counts) tracked by the computer system 200 is modified based on a comparison of a processor's current operating frequency and maximum operating frequency. In at least some embodiments, the modification is accomplished by weighting count data (or otherwise increasing or decreasing values) based on the comparison before a processor performance utility extracts the data. In this manner, when the processor performance utility extracts the modified counter data and reports the observed processor utilization (e.g., $U_{CPU}$), the true processor utilization (e.g., $U_{CPU\_DYNAMIC}$) is actually reported.

In a second way, the counter data of the computer system 200 is tracked (e.g., as described in FIG. 1), but is not modified before the data is extracted by the processor performance utility. Instead, a utility application separate from the processor performance utility (i.e., a modified processor performance utility) calculates the true processor utilization based on the unmodified counter data as well as information regarding a processor's current operating frequency compared to the processor's maximum operating frequency. The utility application is configured to report the true processor utilization (e.g., $U_{CPU\_DYNAMIC}$) or to provide the true processor utilization to the performance processor utility for reporting. In addition, the processor performance utility may be used to report the observed processor utilization (e.g., $U_{CPU}$).

As shown in FIG. 2, the computer system 200 comprises a plurality of processors or CPUs 202A-202N coupled to a memory 208. The CPUs 202A-202N also couple to clock logic 204 and to a periodic interrupt timer 206. In at least some embodiments, the clock logic 204 operates a main clock or "system clock" for the CPUs 202A-202N. For example, the clock 204 may cause the CPUs 202A-202N to operate at a maximum frequency such as 100 MHz. In response to a command from one of the CPUs 202A-202N or some other control mechanism, the clock logic 204 also is able to cause the CPUs 202A-202N to operate at a frequency that is less than the maximum frequency. For example, the clock logic 204 may receive a command to reduce a clocking frequency from 100 MHz to 80 MHz if a workload provided to the CPUs 202A-202N is determined to be "light."

As shown, the memory 208 stores an OS kernel 220 and user applications 240. In at least some embodiments, the OS kernel 220 comprises monitoring instructions 222, performance counters 224, workload adjustment instructions 226, processor performance utility instructions 228 and performance adjustment instructions 230.

After being configured, the periodic interrupt timer 206 interrupts the CPUs 202A-202N. During the interrupt, the monitoring instructions 222 determine the last activity being executed (or the next activity to be executed) by each CPU. For example, CPU activities may be classified as OS kernel activities, user application activities and idle activities. In some embodiments, the monitoring instructions 222 are executed periodically (e.g., once every 10 ms). The monitoring instructions 222 also cause data such as counts to be stored in the counters 224. In at least some embodiments, the counters 224 comprise memory that is allocated to store count data.

When executed, the processor performance utility instructions 228 cause the counter data to be extracted. In some embodiments, the processor performance utility instructions 228 calculates an observed processor utilization for one or more processors based on Equation (1) described above. The processor performance utility instructions 228 also cause the calculated observed processor utilization (e.g., $U_{CPU}$) to be reported to a user via a visual representation such as alphanumeric values and/or graphs. The processor utilization is calculated and updated on a periodic basis by the processor performance utility instructions 228 based on processor activity counts that are tracked and stored by executing the monitoring instructions 222.

When executed, the workload adjustment instructions 226 determine whether at least one of the CPUs 202A-202N is executing a light workload. For example, the workload adjustment instructions 226 may operate in conjunction with the monitoring instructions 222 to determine that a threshold percentage (e.g., 30%) of CPU activities are idle. In such case, the workload adjustment instructions 226 may cause the clocking logic 204 to decrease an operating frequency of the CPUs 202A-202N (e.g., from 100 MHz to 80 MHz). Decreasing the operating frequency of the CPUs 202A-202N helps to conserve power that is otherwise wasted to clock the CPUs 202A-202N even though idle operations are being performed. In some embodiments, changes to a CPU's workload is dynamic and is due, at least in part, to execution of the user applications 240 (i.e., increases or decreases in the number of user application instructions to be executed causes a CPU's workload to change accordingly). In at least some embodiments, the processor performance utility instructions 228 described above do not directly account for dynamic changes to a CPU's operating frequency resulting in potentially inaccurate processor utilization values.

When executed, the performance adjustment instructions 230 cause a true processor utilization to be reported. As described above, the true processor utilization accounts for dynamic changes to a CPU's operating frequency. The performance adjustment instructions 230 may operate in at least two ways. In the first way, the performance adjustment instructions 230 modify the counts in the counters 224 before the counts are extracted by the processor performance utility instructions 228. For example, the counts may be weighted by the ratio of a processor's current operating frequency compared to the processor's maximum operating frequency. In some embodiments, the count modification is performed for each count (i.e., the value of each count may be adjusted to reflect a processor's current operating frequency compared to the processor's maximum operating frequency). Alternatively, the count modification is performed after a predetermined number of counts have occurred. In either case, the processor performance utility instructions 228 extract the modified count data and report the true processor utilization rather than the observed processor utilization.

In the second way, the performance adjustment instructions 230 do not modify the count data. Instead, the performance adjustment instructions 230 use the existing count data to determine the observed processor utilization. If necessary, the observed processor utilization is modified based on a comparison of a CPU's current operating frequency and maximum operating frequency to determine the true processor utilization (e.g., the performance adjustment instructions 230 may implement Equation (2) to determine the true processor utilization). In some embodiments, the performance adjustment instructions 230 report (or display) the true processor utilization separately from the observed processor utilization reported by the processor performance utility instructions 228. Alternatively, the performance adjustment instructions 230 may operate in conjunction with the processor performance utility instructions 228 such that the processor performance utility instructions 228 report the true processor utilization.

Figure 3:
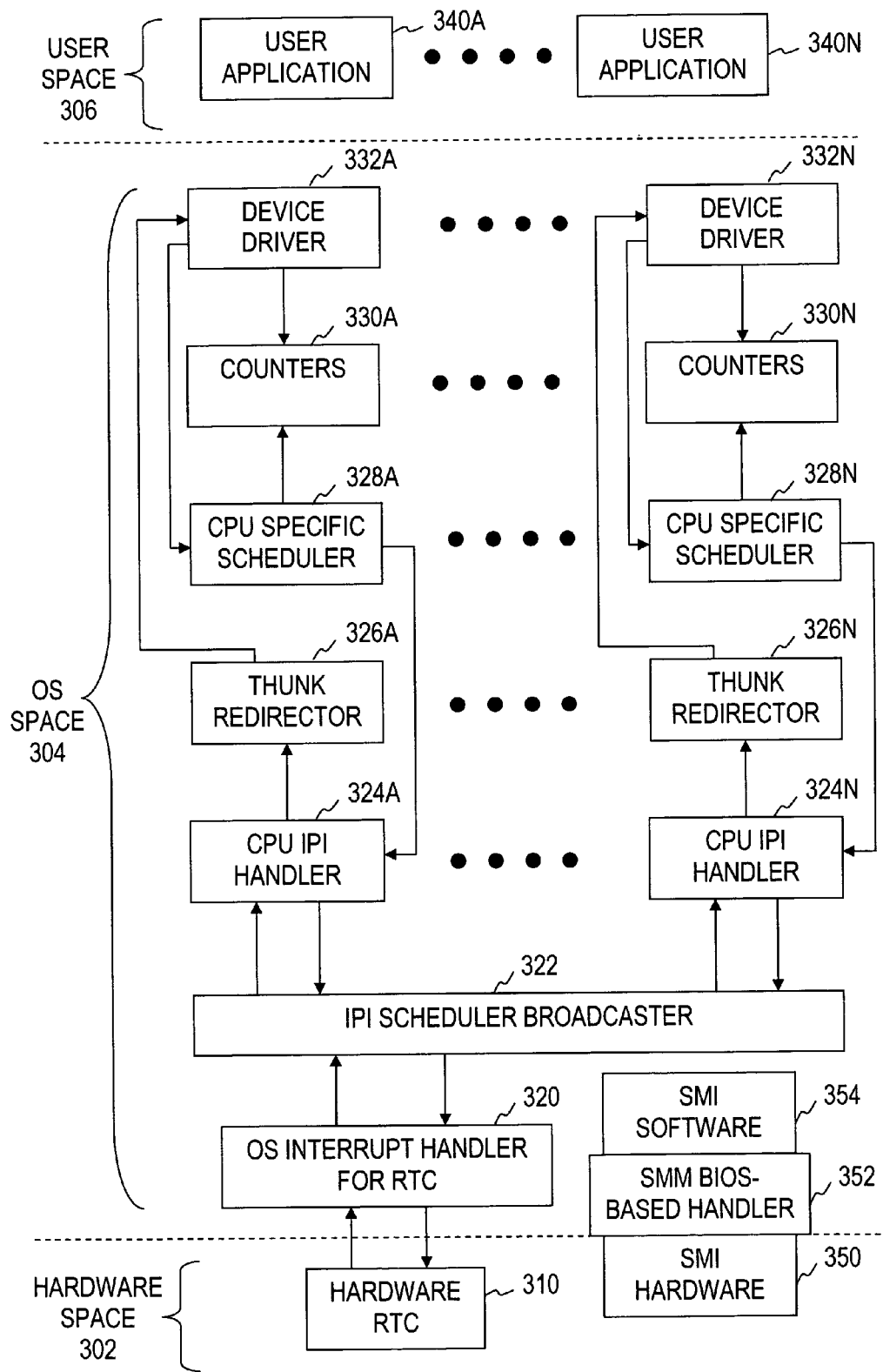
FIG. 3 shows a system that determines true processor utilization in accordance with embodiments of the invention.

FIG. 3 illustrates a system 300 that determines true processor utilization in accordance with embodiments of the invention. For example, the system 300 may represent components of the computer system 200 described above. As shown in FIG. 3, the system 300 is divided into a hardware space 302, an OS space 304 and a user space 306 for illustrative purposes. As will be described herein, at least some embodiments of the invention rely on elements from each of the hardware space 302, the OS space 304 and the user space 306

The hardware space 302 represents physical components of the system 300 such as processors, busses, bridges and memory. As shown, the hardware space 302 comprises a hardware-based real-time clock (RTC) 310 as well as System Management Interrupt (SMI) hardware 350. The hardware RTC 310 is the main OS timing mechanism in the system 300 and is sometimes referred to as the "system clock." The SMI hardware 350 comprises hardware that is configured to generate interrupts to trigger management related activities in an Original Equipment Manufacturer (OEM) software stack (e.g., the SMM handler 352 and the SMI software 354).

The OS space 304 represents an operating system (OS). The OS is responsible for commanding, controlling, and managing hardware resources to enable software applications to "run" (be executed) in a safe and controlled manner. As shown, the OS space 304 comprises an OS interrupt handler 320 as well as an Inter-Processor Interrupt (IPI) scheduler broadcaster 322. The OS interrupt handler 320 comprises computer-readable instructions provided by the OS to receive and handle hardware interrupts from the RTC 310. The OS interrupt handler 320 also tracks global system timing and communicates with (or "calls") the IPI scheduler broadcast 322. The IPI scheduler broadcaster 322 comprises computer-readable instructions provided by the OS to broadcast timing events to all processors (e.g., CPUs) of the computer system 300. In some embodiments, the IPI scheduler broadcaster 322 is part of the OS interrupt handler 320.

For each CPU of the system 300, the OS space 304 comprises a CPU IPI handler 324A-324N, a thunk redirector 326A-326N, a CPU specific scheduler 328A-328N, counters 330A-330N and device drivers 332A-332N. Each CPU IPI handler 324A-324N comprises computer-readable instructions provided by the OS to run on a CPU and to gather timing statistics of the OS as well as user processes. Each thunk redirector 326A-326N comprises computer-readable instructions provided by the OS to intercept calls made by the OS to OEM provided driver code (e.g., the device drivers 332A-332N). Each CPU specific scheduler 328A-328N comprises computer-readable instructions provided by the OS to adjust counters (e.g., the counters 330A-330N) that track CPU utilization. Each counter 330A-330N comprises a block of memory allocated and "owned" by the CPU specific schedulers 328A-328N (e.g., the CPU specific scheduler 328A owns the counters 330A, the CPU specific scheduler 328B owns the counter 330B and so on).

Each device driver 332A-332N comprises computer-readable instructions provided by an OEM to monitor real-time hardware performance such as CPU throttling (i.e., changes to a CPU's operating frequency). In the computer system embodiment of FIG. 3, each device driver 332A-332N is configured to monitor changes in the operating frequency of a CPU based on information received from the CPU IPI handlers 324A-324N via a thunk redirector (e.g., the device driver 332A receives information from the CPU IPI handler 324A via the thunk redirector 326A, the device driver 332B receives information from the CPU IPI handler 324B via the thunk redirector 326B, and so on). As previously described, each CPU IPI handler 324A-324N gathers timing statistics of OS and user processes. By monitoring the timing statistics from each CPU IPI handler 324A-324N and the data stored in each counter 330A-330N, the device drivers 332A-332N are configured, if necessary, to cause the CPU specific schedulers 328A-328N to adjust the counter data stored in the counters 330A-330A.

For example, if the operating frequency of a CPU is reduced due to a light workload, the corresponding CPU specific scheduler may adjust a performance counter's data to reflect the CPU's true processor utilization (i.e., a CPU's true processor utilization accounts for circumstances in which the CPU does not operate at a maximum frequency). In some embodiments, a CPU specific scheduler is configured to change the value of counts (i.e., counts may be weighted or simply changed from one value to another) such that when the changed count data is extracted to calculate the observed processor utilization ($U_{CPU}$) based on Equation (1), the true processor utilization is the value that results. As described above, information from three counters (e.g., an OS kernel counter, a user application counter, and an idle counter) may be used to determine an observed processor utilization ($U_{CPU}$). Thus, to reflect a CPU's true processor utilization one or more of these counts may be changed.

For example, using the previously described count data (i.e., OS kernel count=20, user application count=70, and idle count=10) and Equation (1), the observed processor utilization ($U_{CPU}$) is determined to be 90%. However, if the processor is operating at only 80% of its maximum operating frequency, the observed processor utilization of 90% is inaccurate (i.e., the true processor utilization is actually 90%*(80/100)=72%. To account for the processor's operating at less that a maximum frequency, a device driver (e.g., the device drivers 332A-332N) may cause a CPU specific scheduler (e.g., the CPU specific schedulers 328A-328N) to adjust the count data of one or more of the counters before a processor performance utility extracts the data. For example, to change a 90% utilization to a 72% utilization based on the Equation (1), a device driver may cause the number of idle counts to be increased (e.g., if OS kernel count=20 and user application count=70, adjusting the idle count from idle count=10 to idle count=35 results in the $U_{CPU}$ calculation changing from 90% to 72%). Alternatively, to change a 90% utilization to a 72% utilization based on the Equation (1), a device driver may cause a user application count to be decreased (e.g., if OS kernel count=20 and idle count=10, adjusting the user application count from user application count=70 to user application count=6 results in the $U_{CPU}$ calculation changing from 90% to 72%). Alternatively, one or both of the OS kernel count and the user application count may be reduced, while the idle count is increased to account for a processor operating at less than a maximum operating frequency.

In some embodiments, both weighted counts and non-weighted counts may be stored by the counters (e.g., if a processor is operating at 80% of its maximum frequency, the weighted counts are adjusted by a factor of 0.8). Thus, if the non-weighted counts are OS kernel count=20, user application count=70, and idle count=10, then the weighted counts are OS kernel count=20*0.8=16, user application count=70*0.8=56 and idle count=10+(20−16)+(70−56)=28 (i.e., the idle count is increased by the amount that the OS kernel count and the user application count is decreased). In some embodiments, the weighted counts and the non-weighted counts are stored and aggregated for each interrupt. Alternatively, the weighted counts are determined after a predetermined number of non-weighted counts or after a predetermined time period. In either case, the weighted counts may be obtained by multiplying the non-weighted count values by a weight that reflects a processor's current operating frequency compared to the processor's maximum operating frequency. After the counts have been modified or weighted, the processor performance utility (e.g., the processor performance utility instructions 226) may extract the information from the counters to calculate and report a true processor utilization.

As shown, the OS space 304 also comprises System Management Interrupt (SMI) software 354 and a System Management Mode (SMM) handler 352 which may be based on a Basic Input/Output System (BIOS). The SMI software 354 comprises computer-readable instructions configured to generate a SMM interrupt. In at least some embodiments, the SMI software 354 operates in conjunction with OEM drivers to handle hardware management unknown to the OS of the system 300. The SMM handler 352 comprises computer-readable instructions provided by an OEM to provide an SMM mode to manage hardware.

As shown, the user space 306 represents a domain of applications that run to satisfy user needs. As shown, the user space 306 comprises a plurality of user applications 340A-340N. As CPUs of the system 300 execute different user applications 340A-340N, the processor utilization measured by a processor performance utility changes. For example, if the workload provided by the user applications 340A-340N to the CPUs is "light," the operating frequency of one or more CPUs of the system 300 may be reduced.

In multi-processor embodiments, such as the embodiments shown in FIGS. 2 and 3, calculating and reporting the observed processor utilization and the true processor utilization as described above applies to individual processors as well as to groups of processors. For example, in order to calculate the observed processor calculation for a plurality of processors, the counter data collected for each processor (i.e., the OS kernel counts, the user application counts and the idle counts) may be accumulated to determine a total observed multi-processor utilization. Alternatively, the totaled observed multi-processor utilization may be determined by calculating individual observed processor utilizations and averaging the observed processor utilizations.

A "true" multi-processor utilization may be determined by weighting or modifying the counter data for each processor (based on a comparison of each processor's current operating frequency and maximum operating frequency) before the counter data is extracted. In this manner, a calculation of the observed multi-processor utilization actually provides the true multi-processor utilization. Alternatively, the counter data of each processor may be unmodified before being extracted. If unmodified counter data is extracted, the true multi-processor utilization value is determined by calculating individual true processor utilizations (as described above) and averaging the individual true processor utilizations. Alternatively, the true multi-processor utilization value is determined by calculating the observed multi-processor utilization, then adjusting (e.g., multiplying) the observed multi-processor utilization by the average of the ratios of each processor's current operating frequency and maximum operating frequency.

Figure 4:
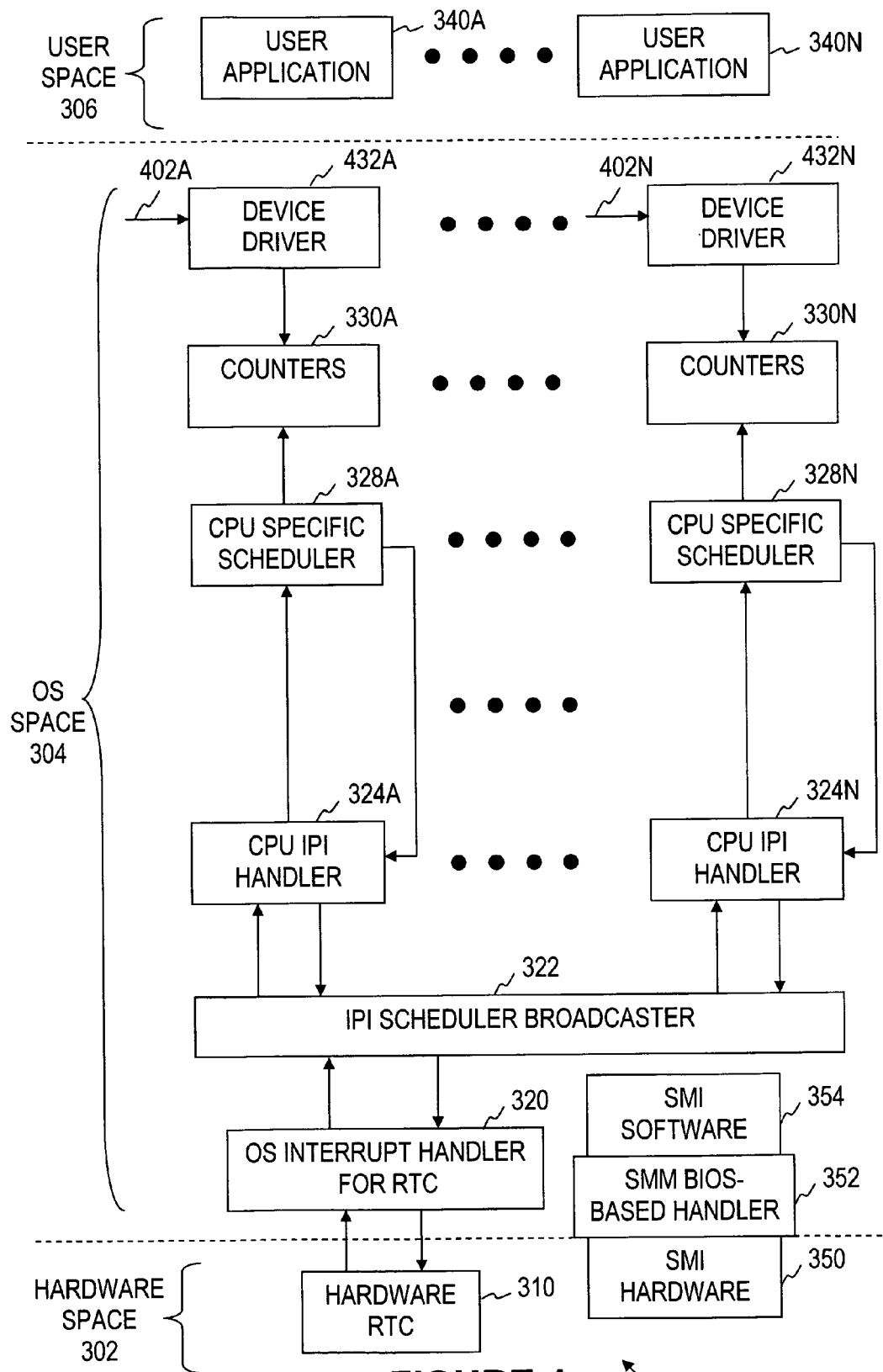
FIG. 4 shows another system that determines true processor utilization in accordance with alternative embodiments of the invention.

FIG. 4 shows another system 400 in accordance with alternative embodiments of the invention. As shown, many of the components of the system 400 are the same or similar to the components of the system 300 described previously in FIG. 3. The system 400 differs from the system 300, at least by eliminating thunk redirectors (e.g., the thunk redirectors 326A). Also the device drivers 432A-432N do not cause the CPU specific schedulers 328A-328N to modify or weight the count data stored in the counters 330A-330N. Instead, each device driver 432A-432N reads the unmodified count data from each corresponding counter 330A-330N and calculates the true processor utilization based on a received signal 402A-402N. In at least some embodiments, the signal 402A-402N comprises an OEM device driver interrupt. The signal 402A-402N notifies each device driver 432A-432N of changes to a CPU's operating frequency (e.g., the signal 402A notifies the device driver 432A, the signal 402B notifies the device driver 432B, and so on).

Each device driver 432A-432N is able to calculate and report a true processor utilization. Additionally or alternatively, each device driver 432A-432N may provide the necessary information (e.g., the counts and the comparison of a processor's current operating frequency and maximum operating frequency) so that another performance utility is able to calculate and report the true processor utilization.

Figure 5:
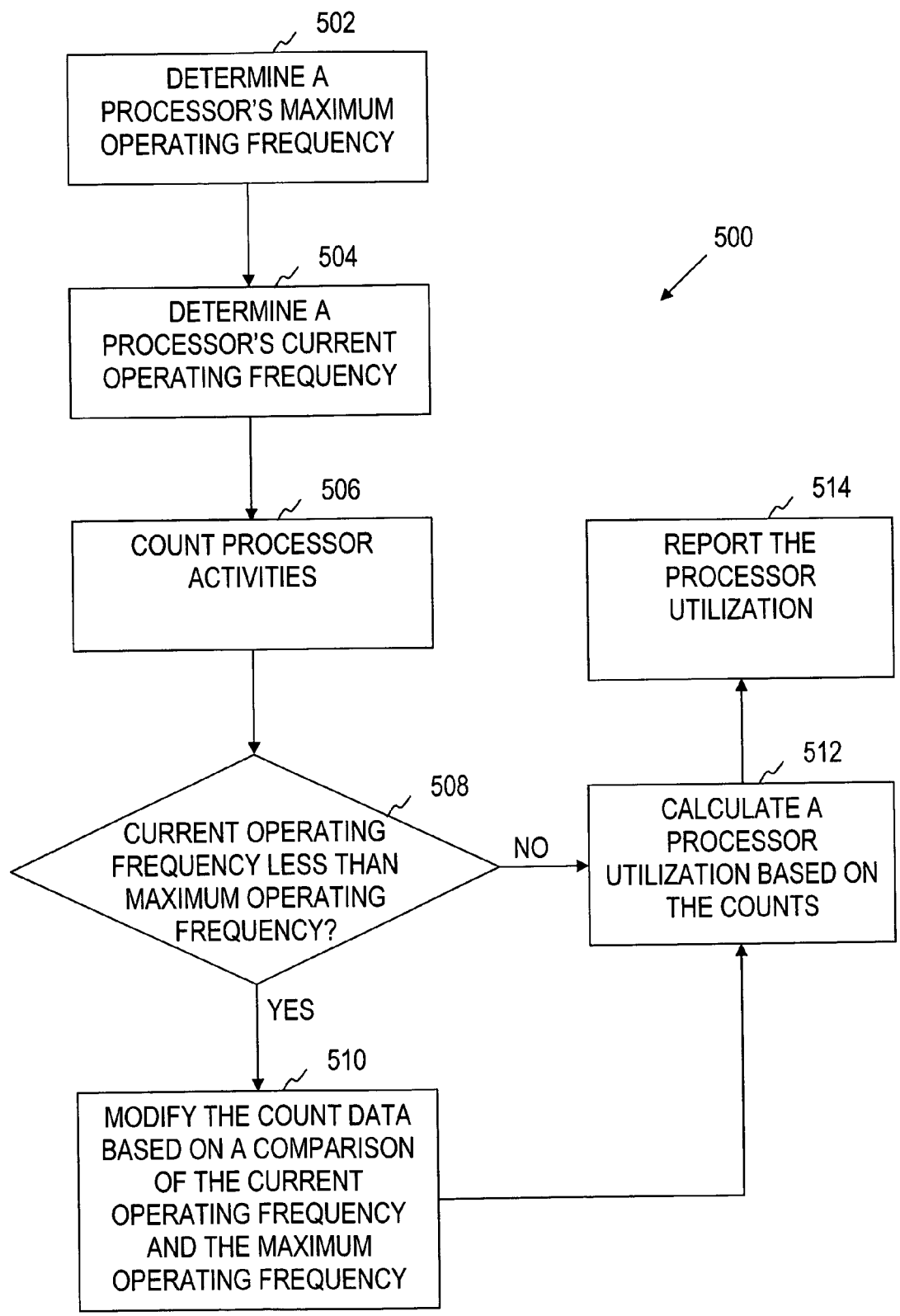
FIG. 5 shows a method in accordance with embodiments of the invention.

FIG. 5 shows a method 500 in accordance with embodiments of the invention. As shown in FIG. 5, the method 500 comprises determining a processor's maximum operating frequency (block 502) and determining the processor's current operating frequency (block 504). The method 500 further comprises counting processor activities (block 506). If the current operating frequency is less than the maximum operating frequency (determination block 508), the count data is modified based on a comparison of the current operating frequency and the maximum operating frequency (block 510). For example, the count data may be weighted or may be adjusted to account for the difference in the processor's current operating frequency and maximum operating frequency. After the count data has been modified (block 510) or if the current operating frequency is not less than the maximum operating frequency (determination block 508), the method 500 comprises calculating a processor utilization based on the count data (block 512). Finally, the processor utilization is reported (block 514).

Figure 6:
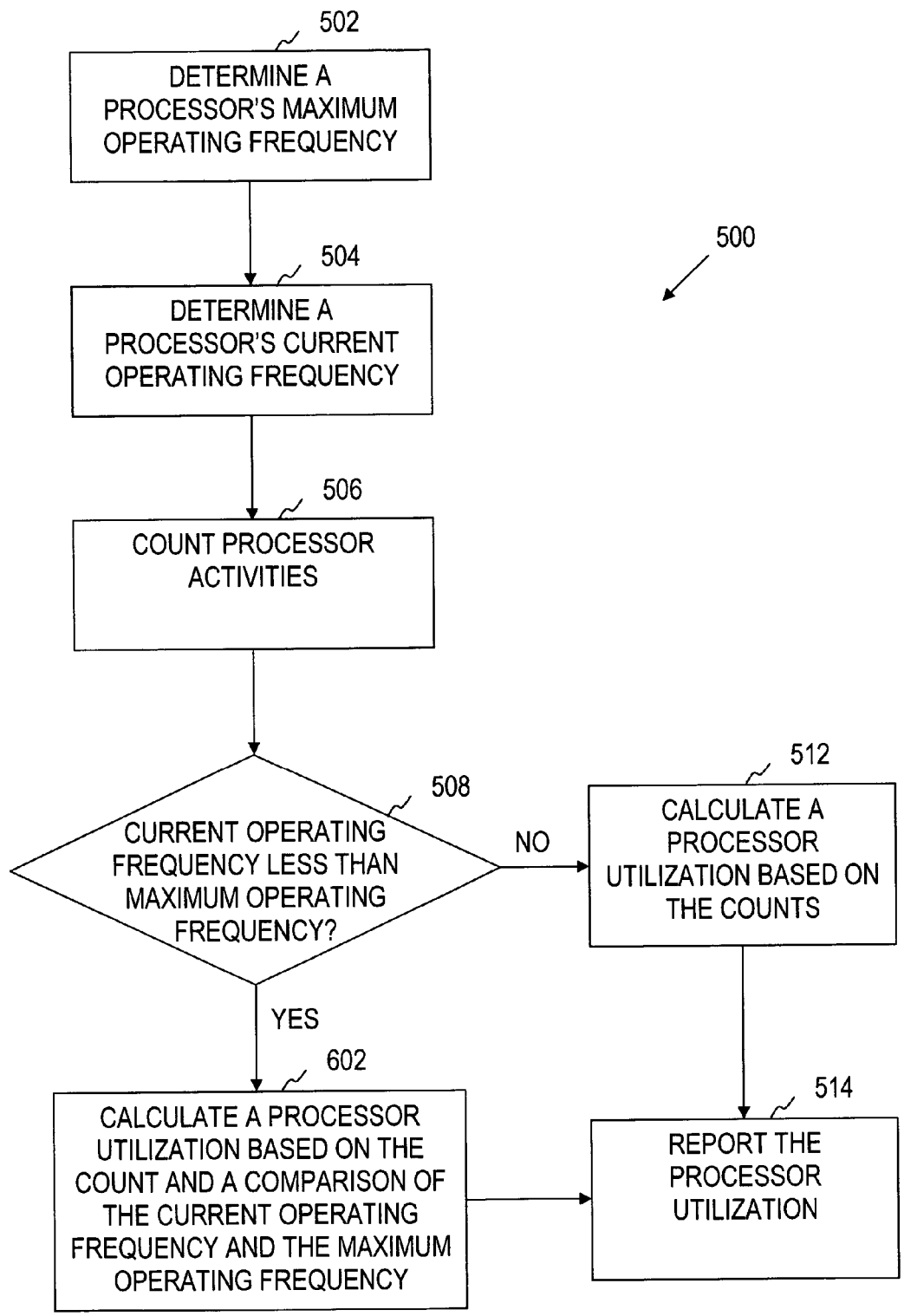
FIG. 6 shows another method in accordance with alternative embodiments of the invention.

FIG. 6 shows another method 600 in accordance with alternative embodiments of the invention. As shown in FIG. 6, the method 600 comprises many of the blocks described above in FIG. 5. The difference between the method 600 and the method 500 is that the method 600 does not modify the count data. If the current operating frequency of a processor is less than the processor's maximum operating frequency (determination block 508), the method 600 calculates a true processor utilization based on the count data and a comparison of the processor's current operating frequency and maximum operating frequency (block 602). If the current operating frequency of a processor is not less than the processor's maximum operating frequency (determination block 508), the method 600 calculates an observed processor utilization based only on the count data (block 512). Finally, either the observed processor utilization or the true processor utilization (i.e., the true processor utilization accounts for dynamic changes in a processor's operating frequency) is reported (block 514). As previously described, reporting the true processor utilization value ($U_{CPU\_DYNAMIC}$) is useful in several ways. For example, an administrator or other user may rely on the true processor utilization to determine business-related details such as the efficiency of an application, an amount of servers to deploy and/or an amount of money to charge customers.

The above discussion is meant to be illustrative of the principles and various embodiments of the present invention. Numerous variations and modifications will become apparent to those skilled in the art once the above disclosure is fully appreciated. For example, although the components of FIGS. 3 and 4 are assigned into an OS space 304 and a user space 306, some components such as the processor performance utility may be either in the OS space 304 or the user space 306. It is intended that the following claims be interpreted to embrace all such variations and modifications.

What is claimed is:

1. A system, comprising:
   a processor; and
   a memory coupled to the processor, the memory stores processor performance utility instructions and performance adjustment instructions,
   when executed, the processor performance utility instructions are configured to cause activities of the processor to be counted and to cause a processor utilization value to be determined based on the counts,
   when executed, the performance adjustment instructions are configured to adjust the processor utilization value based on a comparison of the processor's current operating frequency and maximum operating frequency,
   wherein the performance adjustment instructions adjust the processor utilization value by multiplying the processor utilization value by a weight that represents a ratio of the processor's current operating frequency to the processor's maximum operating frequency.

2. The system of claim 1 wherein the performance adjustment instructions adjust the processor utilization value by altering the counts based on the comparison before the processor utilization value is determined.

3. The system of claim 2 wherein the counts of processor activities include an operating system (OS) kernel count and a user application count and wherein both the OS kernel count and the user application count are reduced by a ratio of the processor's current operating frequency to the processor's maximum operating frequency.

4. The system of claim 3 wherein the counts of processor activities include a processor idle count and wherein said processor idle count is increased by a total amount that the OS kernel count and the user application count are decreased.

5. The system of claim 1 wherein the memory stores workload adjustment instructions that, when executed, are configured to adjust the processor's operating frequency based on a workload of the processor.

6. A method, comprising:
   determining a processor's maximum operating frequency;
   determining a processor's current operating frequency;
   comparing the processor's current operating frequency with the processor's maximum operating frequency;
   if the current operating frequency is less than the maximum operating frequency, calculating a processor utilization value and adjusting the processor utilization value based on said comparison;
   counting processor activities, wherein calculating the processor utilization value is based on processor activity counts; and
   modifying the processor activity counts based on the comparison before the processor utilization value is calculated.

7. The method of claim 6 wherein modifying the processor activity counts comprises reducing at least one of an operating system (OS) kernel count and a user application count.

8. The method of claim 6 wherein modifying the processor activity counts comprises increasing a processor idle count.

9. The method of claim 6 further comprising using the adjusted processor utilization value to determine at least one business-related detail selected from the group consisting of an efficiency of an application, an amount of servers to deploy and an amount of money to charge customers.

10. A method. comprising:
determining a processor's maximum operating frequency;
determining a processor's current operating frequency;
comparing the processor's current operating frequency with the processor's maximum operating frequency;
if the current operating frequency is less than the maximum operating frequency. calculating a processor utilization value and adjusting the processor utilization value based on said comparison; counting processor activities, wherein calculating the processor utilization value is based on processor activity counts; and
determining a first processor utilization value based on the processor activity counts and determining a second processor utilization value by multiplying the first processor utilization value by a ratio of the processor's current operating frequency to the processor's maximum operating frequency.

11. A digital storage medium storing computer-readable instructions that, when executed, cause a computer system to:
determine a processor's maximum operating frequency;
determine a processor's current operating frequency;
count processor activities;
if the processor's current operating frequency is less than the processor's maximum operating frequency, calculate a processor utilization value based on processor activity counts and a comparison of the processor's current operating frequency and maximum operating frequency; and
modify the processor activity counts based on the comparison of the processor's current operating frequency and maximum operating frequency.

12. The digital storage medium of claim 11 wherein the computer-readable instructions, when executed, further cause the computer system to dynamically adjust the processor's operating frequency based on a workload of the processor.

13. A digital storage medium storing computer-readable instructions that, when executed, cause a computer system to:
determine a processor's maximum operating frequency;
determine a processor's current operating frequency;
count processor activities;
if the processor's current operating frequency is less than the processor's maximum operating frequency, calculate a processor utilization value based on processor activity counts and a comparison of the processor's current operating frequency and maximum operating frequency; and
determine a first processor utilization value based on the processor activity counts and determine a second processor utilization value by multiplying the first processor utilization value by a ratio of the processor's current operating frequency to the processor's maximum operating frequency.

14. A system, comprising:
means for comparing a processor's current operating frequency and maximum operating frequency; and
means for calculating a processor utilization value based on a ratio of the processor's current operating frequency to the processor's maximum operating frequency; and
means for modifying processor activity count data based on a comparison of the processor's current operating frequency and maximum operating frequency, the processor activity count data being used in calculating the processor utilization value.

15. A system comprising:
means for comparing a processor's current operating frequency and maximum operating frequency; and
means for calculating a processor utilization value based on a ratio of the processor's current operating frequency to the processor's maximum operating frequency;
wherein said means for calculating a processor utilization value comprises means for calculating a first processor utilization value based on processor activity count data and means for calculating a second processor utilization value by modifying the first processor utilization value based on the ratio of the processor's current operating frequency to the processor's maximum operating frequency.

16. A system, comprising:
a plurality of processors; and
a memory coupled to the plurality of processors, the memory stores processor utility instructions and adjustment instructions,
when executed, the processor utility instructions are configured to cause activity count data to be collected for a processor and to cause an observed processor utilization value to be determined based on the activity count data,
when executed, the adjustment instructions are configured to calculate a true processor utilization value for the processor based on a comparison of the processor's current operating frequency and maximum operating frequency,
wherein the processor utility instructions are further configured, when executed, to cause activity count data to be collected for each of the plurality of processors and to cause an observed processor utilization value to be determined for each processor based on the activity count data for each of the plurality of processors.

17. The system of claim 16 wherein the processor utility instructions are further configured, when executed, to determine an average of the observed processor utilization values.

18. The system of claim 16 wherein the adjustment instructions are further configured, when executed, to calculate a true processor utilization value for each of the plurality of processors based on a comparison of each processor's current operating frequency and maximum operating frequency.

19. The system of claim 18 wherein the adjustment instructions are further configured, when executed, to determine an average of the true processor utilization values.

* * * * *

UNITED STATES PATENT AND TRADEMARK OFFICE
CERTIFICATE OF CORRECTION

PATENT NO. : 7,594,128 B2
APPLICATION NO. : 11/193834
DATED : September 22, 2009
INVENTOR(S) : Reza M. Bacchus et al.

It is certified that error appears in the above-identified patent and that said Letters Patent is hereby corrected as shown below:

In column 11, line 11, in Claim 10, delete "method." and insert -- method, --, therefor.

In column 11, line 17, in Claim 10, delete "frequency." and insert -- frequency, --, therefor.

In column 12, line 15, in Claim 15, delete "system" and insert -- system, --, therefor.

Signed and Sealed this

Twentieth Day of July, 2010

David J. Kappos
*Director of the United States Patent and Trademark Office*